(12) United States Patent
Sabiers et al.

(10) Patent No.: US 6,889,160 B2
(45) Date of Patent: May 3, 2005

(54) SIMULATION OF NETWORK SERVICE TEST ENVIRONMENTS

(75) Inventors: Mark L. Sabiers, Fort Collins, CO (US); David Christopher Davidson, Camas, WA (US); Jay D. Knitter, Wellington, CO (US); Donna J. Grush, Fort Collins, CO (US); Terry M. Martin, Fort Collins, CO (US); Blaine R. Southam, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 10 days.

(21) Appl. No.: 10/449,555

(22) Filed: May 30, 2003

(65) Prior Publication Data

US 2004/0243338 A1 Dec. 2, 2004

(51) Int. Cl.[7] .................... G01M 19/00; G06F 15/173; G06F 11/00
(52) U.S. Cl. ...................... 702/122; 702/123; 709/238; 714/47
(58) Field of Search ................. 702/122, 121, 702/123; 709/219, 233, 203, 238; 714/47, 48

(56) References Cited

U.S. PATENT DOCUMENTS

| | | | |
|---|---|---|---|
| 5,864,852 A | 1/1999 | Luotonen | |
| 6,044,398 A | 3/2000 | Marullo et al. | |
| 6,138,157 A | 10/2000 | Welter et al. | |
| 6,138,162 A | 10/2000 | Pistriotto et al. | |
| 6,157,940 A | 12/2000 | Marullo et al. | |
| 6,182,141 B1 | 1/2001 | Blum et al. | |
| 6,185,701 B1 | 2/2001 | Marullo et al. | |
| 6,226,677 B1 | 5/2001 | Slemmer | |
| 6,389,462 B1 | 5/2002 | Cohen | |
| 6,418,544 B1 | 7/2002 | Nesbitt et al. | |
| 6,434,513 B1 | 8/2002 | Sherman et al. | |
| 6,477,483 B1 | 11/2002 | Scarlat et al. | |
| 6,519,616 B1 | 2/2003 | Zamora-McKelvy et al. | |
| 6,522,995 B1 | 2/2003 | Conti et al. | |
| 6,754,701 B1 * | 6/2004 | Kessner | 709/219 |

* cited by examiner

*Primary Examiner*—John Barlow
*Assistant Examiner*—Meagan S Walling

(57) ABSTRACT

To facilitate the testing of a testee network service such as a web service made available on the Internet, various embodiments of a network service test system are provided. In one embodiment, a testee network service is tested using a network service test environment. The network service test environment surrounds the testee network service. The network service test environment comprises at least one mock client that is in data communication with and interacts with the testee network service. The network service test environment also includes at least one mock support network service in data communication with the testee network service. The at least one mock support network service simulates a performance of an actual support network service while a data communication link exists between the actual support network service and the testee network service.

26 Claims, 10 Drawing Sheets

SIMULATION OF NETWORK SERVICE TEST ENVIRONMENTS

BACKGROUND

For software developers who create web services implemented on the Internet for Application Service Providers (ASPs) or other entities, it is often desirable to test the operation of such web services before they are actually made available to the public to ensure that no bugs exist that will hinder the experience of the users. Such web services that are tested might receive requests from browsers that run on client devices and respond thereto. Also, in generating a response, a web service may interact with one or more support web services to obtain information or perform various functions. For example, a website for a particular store may wish to incorporate a map that shows the physical location of the store. In this regard, the map might be requested from a support web service that generates maps. Consequently, it is possible that bugs may exist in a web service that affect both its interaction with clients and with support web services.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
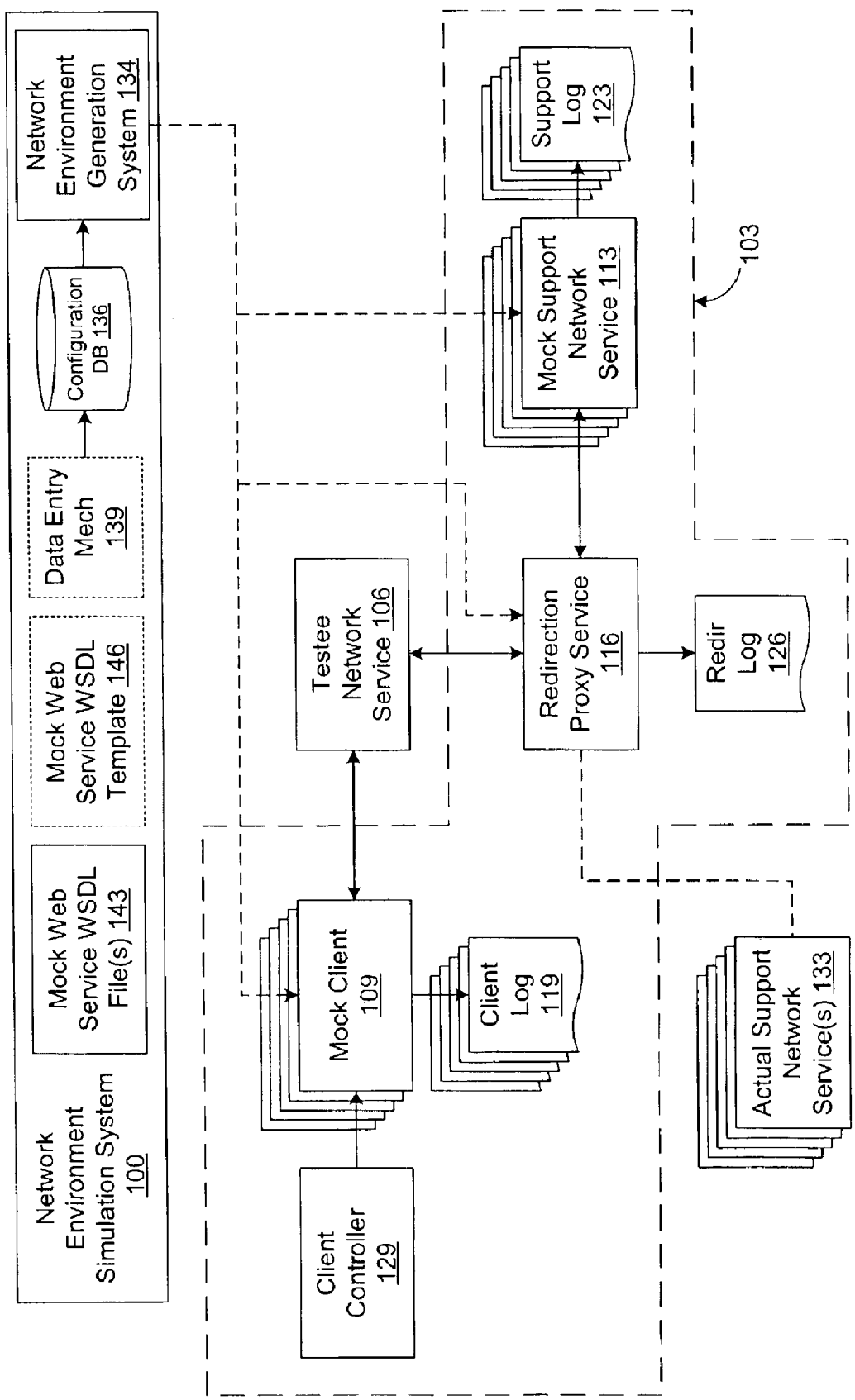
FIG. 1 is a functional block diagram of a network service test environment and a network environment simulation system that generates the network service test environment according to various embodiments of the present invention.

With reference to FIG. 1, shown is functional block diagram of both a network service environment simulation system 100 and a network service test environment 103 generated by the network service environment simulation system 100 according to various embodiments of the present invention. Also shown is a testee network service 106 that is tested by the network service test environment 103. The testee network service 106 may be, for example, a web service that is made available on the World Wide Web or other type of network service. In this respect, a web service as contemplated herein typically provides dynamic content over the Internet. That is to say, initially, content published on the World Wide Web was in the form of static pages that were downloaded to a user's browser. The browser interpreted the page for display, as well as handling user input to objects such as forms or buttons. Lately, the emergence of what are known as "Web services" have been used to extend the Web's capability to provide the dynamic content that is accessible by other programs besides browsers.

Web services are network-based applications such as Internet-based applications that perform a specific task and conform to a specific technical format. Web services are represented by a stack of emerging standards that describe a service-oriented, application architecture, collectively providing a distributed computing paradigm having a particular focus on delivering services across the Internet.

Generally, Web services are implemented as self-contained modular applications that can be published in a ready-to-use format and can be located and invoked across the World Wide Web. When a Web service is deployed, other applications and Web services can locate and invoke the deployed service. They can perform a variety of functions, ranging from simple requests to complicated business processes.

Web services are typically configured to use standard Web protocols such as Hypertext Transfer Protocol (HTTP), Hypertext Markup Language (HTML), Extensible Markup Language (XML) and Simplified Object Access Protocol (SOAP). HTTP is an application-level protocol commonly used to transport data on the Web. HTML and XML are formatting protocols typically used to handle user input, encapsulate user data, and format output for display. SOAP is a remote procedure call (RPC) and document exchange protocol often used for requesting and replying to messages between Web services.

Where the testee network service 106 is a web service, then the network service test environment 103 may be, for example, a web service test environment. In such case, the network service environment simulation system 100 is a web service environment simulation system 100 that generates the web service test environment, etc.

As shown in FIG. 1, each block may represent a module, object, or other grouping or encapsulation of underlying functionality as implemented in programming code. However, the same underlying functionality may exist in one or more modules, objects, or other groupings or encapsulations that differ from those shown in FIG. 1 without departing from the present invention as defined by the appended claims.

The network service test environment 103 includes one or more mock clients 109 and may include one or more mock support network services 113. Alternatively, in some situations, the network service test environment 103 may not include any mock support network services 113. In the case that the testee network service 106 is a web service as discussed above, the mock clients 109 might incorporate browser technology and the mock support network services 113 may be mock support web services that simulate actual support web services. The network service test environment 103 also includes a redirection proxy service 116 referred to hereafter as redirector 116. Alternatively, where no mock support network services 113 are included in the network service test environment 103, then the redirector 116 may not be included as well. A client log 119 is associated with each of the mock clients 109. In this respect, each of the mock clients 109 writes log entries associated with all data transmission activity that each mock client 109 transmits and receives to a respective one of the client logs 119. Also, each of the mock clients 109 may write log entries to their respective client logs 119 that are associated with other operational activity such as error conditions, etc., experienced by the mock clients 109.

Similarly, a support log 123 is associated with each of the mock support network services 113. Each of the mock support network services 113 writes log entries associated with all data transmission activity that each mock support network service 113 transmits to a respective one of the support logs 123. Also, each of the mock support network services 113 may write log entries to their respective support logs 123 that are associated with other operational activity such as error conditions, etc., experienced by the support network services 113.

In addition, a redirector log 126 is associated with the redirector 116 to which the redirector 116 writes an entry recording all data transmission activity that it reroutes and entries for other operational activity such as error conditions, etc.

The network service test environment 103 also includes a client controller 129 that is employed to execute the operation of each of the clients 109 as will be discussed. Also shown is an actual support network service 133 that may be, for example, a web service made available on the Internet as part of the World Wide Web or some other network. The redirector 116 reroutes data traffic transmitted to the actual network web services 133 from the testee network service 106 to the mock support network services 113 as will be discussed.

The network environment simulation system 100 also includes a network environment generation system 134 and a configuration database 136. The configuration database 136 is employed to store data that is used in generating the mock clients 109, the mock support network services 113, and the redirector 116. The network environment generation system 134 is executed as a portion of the network environment simulation system 100. The network environment simulation system 100 also includes a data entry mechanism 139 that may be manipulated by a user to enter data that is used to generate the mock clients 109, the mock support network services 113. The data is also used to configure the redirector 116. The network environment generation system 134 employs the data to generate the mock clients 109 and the mock support network services 113, and to configure the redirector 116. In the case that the testee network service 106 is a web service, the network environment simulation system 100 may access one or more mock web service web service description language (WSDL) files 143 to create the mock support network service 113. The mock web service WSDL files 143 are generated using a mock web service WSDL template 146. In this respect, the mock web service WSDL template 146 includes skeletal data structures that are populated with data that is specific to the mock support network service 113 that is to be created. Alternatively, file formats other that a WSDL file may be employed.

Next, a discussion of the operation of the network environment simulation system 100 and the network service test environment 103 is provided. To begin, the user specifies one or more mock web service WSDL files 143 or their equivalent using the mock web service WSDL template 146. The mock web service WSDL files 143 specified are used as inputs to the network environment generation system 134 in creating the mock support network service(s) 113. In some cases, the mock web service WSDL files 143 may not be created where they are not employed in creating the mock support network services 113.

Assuming that the mock web service WSDL files 143 are to be created, then the number of mock web service WSDL files 143 generally equals the number of mock support network services 113 to be created, although it may be the case that one mock web service WSDL files 143 may be employed in the creation of multiple mock support network services 113. Next, the user may manipulate the data entry mechanism 139 associated with the network environment simulation system 100 to input data associated with the network service test environment 103. In this respect, configuration data associated with the testee network service 106, the mock clients 109, the mock support network services 113, and the redirector 116 is entered. Such data is employed in the generation and configuration of these components of the network service test environment 103. Examples of the actual data input is discussed with reference to figures that follow.

Assuming that all data necessary to create the various components of the network service test environment 103 is entered, a user may manipulate the network environment simulation system 100 to generate and configure the network service test environment 103. In this respect, the network environment generation system 134 is executed as a portion of the network environment simulation system 100 to instantiate or otherwise generate one or more mock clients 109 that are in data communication with and that interact with the testee network service 106. In the case that the testee network service 106 is a web service, for example, the mock clients 109 are generated from the WSDL information associated with the testee network service 106. Also, the network environment generation system 134 may instantiate or otherwise generate one or more mock support network services 113 that are in data communication with and that interact with the testee network service 106. The network environment generation system 134 further instantiates or otherwise generates the redirector 116 and the client controller 129. The network environment generation system 134 further performs an automated configuration of the testee network service 106 using configuration data entered by the user as will be discussed.

During the normal operation of the testee network service 106 in a real world environment, the testee network service 106 may generate and transmit various requests or other messages to actual support network services 133. In such case, the requests or messages transmitted by the testee network service 106 may normally be directed to an appropriate network gateway or other device that facilitates the transmission of such requests or messages to the actual support network services 133 over the Internet or other network. However, when the network service test environment 103 is implemented in conjunction with the testee network service 106, all data communication such as requests or other messages generated by the testee network service 106 that would normally be transmitted to one or more of the actual support network services 133 is first routed to the redirector 116.

The redirector 116 may then reroute such data communication or requests to an appropriate one of the mock support network services 113 instead of transmitting such requests to a corresponding actual support network service 133 over the Internet or other network. To ensure all such requests or messages are transmitted to the redirector 116 rather than directly to one of the actual support network services 133, the underlying operating system may be programmed as is appropriate. In one embodiment, for example, the testee network service 106 may run on top of a Java virtual machine that is configured to direct all data traffic originating from the testee network service 106 to the redirector 116. Likewise, all data traffic directed to the testee network service 106 in response to such requests and other communications are routed to the testee network service 106 through the redirector 116.

Given that all requests and other data communications transmitted by the testee network service 106 are directed to the redirector 116, then the redirector 116 can reroute such requests and other data communications to other destinations that differ from the original destinations intended by the testee network service 106. For example, a request transmitted by the testee network service 106 to one of the actual support network services 133 may be rerouted by the redirector 116 to one of the mock support network services 113.

To accomplish the rerouting of requests, the redirector 116 is configured with a table that correlates a number of intended destination addresses with a corresponding number of substitute addresses associated. The intended destination addresses may be associated, for example, with corresponding ones of the actual support network services 133. The substitute addresses may be associated, for example, with corresponding ones of the mock support network services 133.

To illustrate how a request is redirected, assume, for example, that the testee network service 106 transmits a request to one of the actual support network services 133 that is to be rerouted to one of the mock support network services 113. The redirector 116 identifies the intended destination address associated with the request and consults its table to determine if a corresponding substitute address exists. If so, then the substitute address is written into the request in place of the intended destination address and the request is then transmitted to the desired mock support network service 113.

In cases where no substitute address is included in the table associated with the redirector 116 that corresponds to a particular intended destination address, then the request or other data communication is forwarded to the intended destination address. In addition, a user may activate or deactivate the rerouting function of the redirector 116 for selected intended destination addresses. That is to say, when the rerouting function is active for a respective intended destination address, then all requests sent to such address by the testee network service 106 are rerouted. On the other hand, if the rerouting function is inactive for the respective intended destination address, then all requests sent to such address by the testee network service 106 are forwarded to the intended destination address. The network environment simulation system 100 allows a user to activate and deactivate the rerouting function for selected ones of the intended destination addresses as will be discussed.

During execution of the network service test environment 103, each of the mock support network services 113 simulates the function and performance of a corresponding one of the actual support network services 133 while a data communication link exists between the corresponding one of the actual support network services 113 and the testee network service 106. This is to say that if it were not for the rerouting function of the redirector 116, then all messages generated by the testee network service 106 would be routed directly to the respective one of the actual support network services 133. This is advantageous as there may be a charge to the user of the testee network service 106 each time the actual support network services 133 are accessed. Also, each of the mock clients 109 simulates the activity of an actual client device in interacting with the testee network service 106.

Due to the use of the mock clients 109, the mock support network services 113, and the redirector 116, the network service test environment 103 "surrounds" the testee network service 106 by simulating all components with which the testee network service 106 interacts. In one embodiment, the generation of the network service test environment 103 that surrounds the testee network service 106 is done without altering the testee network service 106. If alterations are made, they may comprise changes in configuration of the testee network service 106. Consequently, the network service test environment 103 is capable of testing the testee network service 106 under normal or "real world" operating conditions.

The mock clients 109 and mock support network services 113 are generated, for example, from mock client templates and mock support network service templates. The templates include, for example, a lookup table and other data structures that are populated with data specific to the respective mock client 109 or mock support network service 113.

For example, associated with each of the mock clients 109 are a number of test cases. In this respect, each of the mock clients 109 may include a lookup table or other data structure in which the test cases are stored. Each test case includes a request and a corresponding expected response. Each of the mock clients 109 transmits the requests to the testee web service 106 and waits to receive a response therefrom. The response received may be compared with the expected response that is stored in the lookup table to determine if it is correct. In this respect, the operation of the testee network service 106 may be tested with respect to its interaction with client devices. The requests and expected responses may be expressed, for example, using an appropriate markup language such as extensible markup language (XML) or other appropriate language or syntax. In this respect, the requests and expected responses may include various parameters as can be appreciated by those with ordinary skill in the art. The actual requests and expected responses of each of the test cases are input using the data entry mechanisms 139 as will be discussed with reference to later figures.

The test cases may be grouped into test suites. To associate test cases with one or more mock clients 109, one or more of the test suites may be associated with the mock clients 109. This provides an advantage in that a user may specify the order of a series of test cases that are applied to the testee network service 106 during testing.

In addition, each of the mock support network services 113 includes a table or other data structure that maps a number of predefined requests to a corresponding number of responses. When a mock support network service 113 receives a request from the testee network service 106, the received request is compared to the requests stored within the table or other data structure. The received request is mapped to one of the responses. The corresponding response is then transmitted to the testee network service 106 through the redirector 116 as is provided, for example, by the dictates of HTTP protocol. For example, assuming HTTP protocol is employed, a socket is opened in the redirector 116 in transmitting a request to a mock support network service 113. This socket is closed when the response is received from the mock support network service 113 and relayed back to the testee network service 106. Consequently, the response is transmitted to the testee network service 106 through the redirector 116. Alternatively, the response may be transmitted directly from a mock support network service 113 to the testee network service 106 in the event a protocol other than HTTP is employed, or if the execution of the HTTP protocol with respect to the redirector 116 is appropriately altered. For example, a socket opened by the redirector 116 in sending a request to a mock support network service 113 would have to be closed even though a response was never received therefrom.

In this respect, the mock support network services 113 simulate the operation of the actual support network services 133. The requests and responses may be expressed using XML or other appropriate language or syntax.

The client logs 119, support logs 123, and the redirection log 126 preserve data about the test sessions that are implemented when the network service test environment 103 is generated. For example, the data stored in the logs 119, 123, and 126 may include entries recording what requests were sent and/or received by the respective entities and what responses were sent and/or received in reply thereto. Also, any error conditions are noted for further scrutiny by developers. The entries in the redirection log 126 may indicate which requests and responses were redirected as well as other information about the operation of the redirector 116. To evaluate the performance of the testee network service 106 after one or more test sessions are performed, the data stored in the logs 119,123, and 126 may be consulted accordingly.

Figure 2:
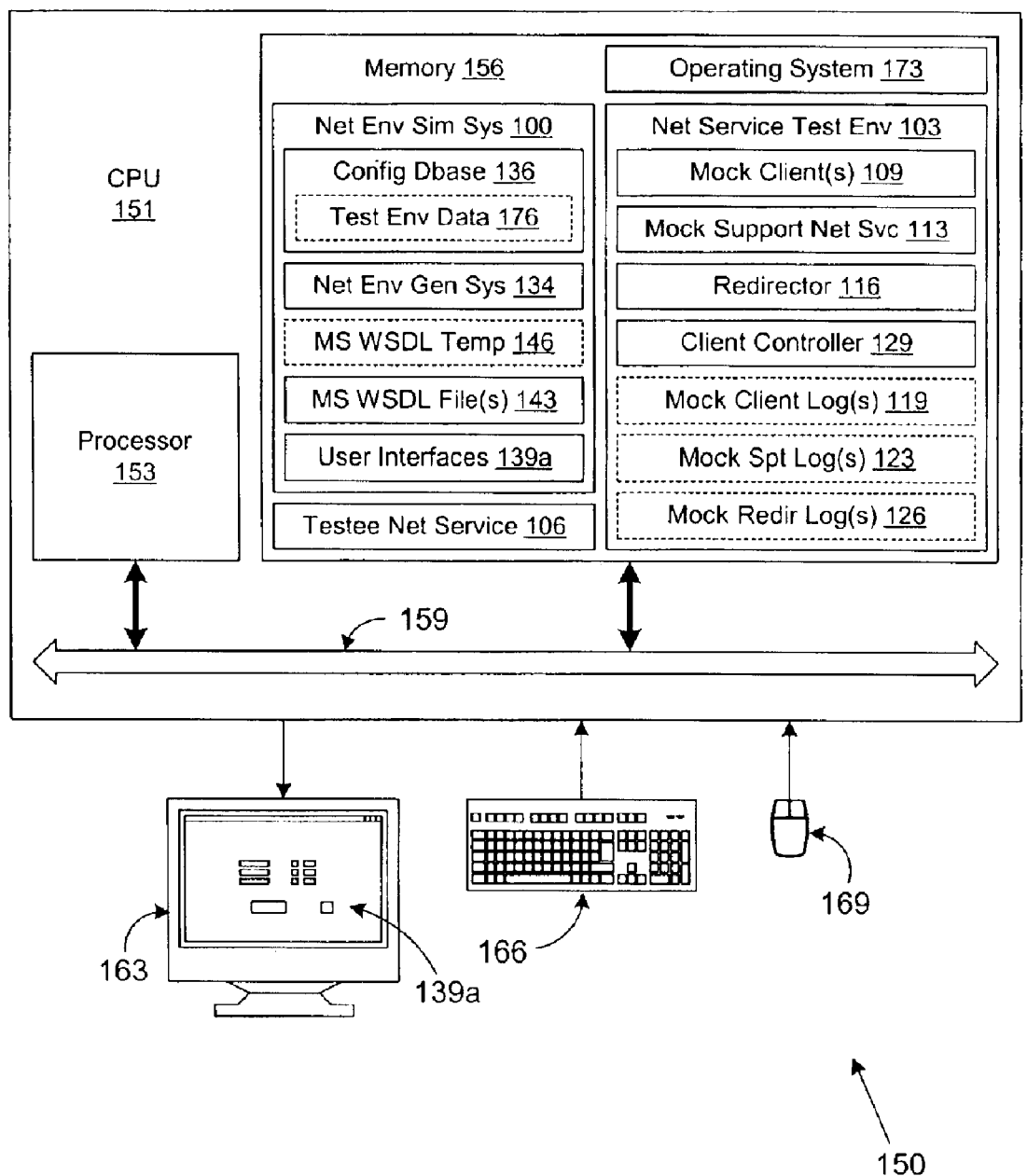
FIG. 2 is a drawing of examples of both the network service test environment and the network environment simulation system of FIG. 1 according to various embodiments of the present invention.

With reference to FIG. 2, shown is an example of a network service testing system 150 according to an embodiment of the present invention. The network service testing system 150 provides one example of an implementation of both the network environment simulation system 100 and the network service test environment 103. The network service testing system 150 includes a central processing unit 151 that includes a processor circuit having a processor 153 and a memory 156, both of which are coupled to a local interface 159. In this respect, the network service testing system 150 may be a computer system or device with like capability.

The network service testing system 150 also includes various peripheral devices such as, for example, a display device 163, a keyboard 166, and a mouse 169. Alternatively, other peripheral devices may be employed with the network service testing system 150 such as, for example, a keypad, touch pad, touch screen, microphone, scanner, joystick, or one or more push buttons, etc. The peripheral devices may also include indicator lights, speakers, printers, etc. The display device 163 may be, for example, a cathode ray tube (CRT), liquid crystal display screen, gas plasma-based flat panel display, or other type of display device, etc.

A number of software components are stored in the memory 156 and are executable by the processor 153. In this respect, the term "executable" means a program file that is in a form that can ultimately be run by the processor 153. Examples of executable programs may be, for example, a compiled program that can be translated into machine code in a format that can be loaded into a random access portion of the memory 156 and run by the processor 153, or source code that may be expressed in proper format such as object code that is capable of being loaded into a of random access portion of the memory 156 and executed by the processor 153, etc. An executable program may be stored in any portion or component of the memory 156 including, for example, random access memory, read-only memory, a hard drive, compact disk (CD), floppy disk, or other memory components.

The components stored in the memory 156 include an operating system 173, the network environment simulation system 100, the testee network service 106, and the network service test environment 103. The network environment simulation system 100 may include, for example, the mock service WSDL template 146 and one or more mock service WSDL files 143. The network environment simulation system 100 also includes the network environment generation system 134, the configuration database 136, and a number of user interfaces 139a. The user interfaces 139a provide one embodiment of the data entry mechanism 139 (FIG. 1) according to the present invention. Stored within the configuration database 136 is test environment data 176 that is employed by the network environment generation system 134 to generate the network service test environment 103. When executed, the network environment simulation system 100 may cause the various user interfaces 139a to be generated on the display device as shown to facilitate control over the network environment simulation system 100 and data entry by a user.

The network service test environment 103 includes one or more mock clients 109, one or more mock support network services 113 (if any), the redirector 116 (if any), and the client controller 129. The network service test environment 103 also includes the mock client logs 119, the mock support logs 123, and the mock redirection log 126.

While the network environment simulation system 100, the network service test environment 103, and the testee network service 106 are described above as being stored in the memory 156 and executable by the processor, it is understood that these systems and each of the components thereof may be stored and executed in multiple computer systems that are linked to a network, etc. For example, the mock clients 109 may be executed on a first computer system, the mock support network services 113 may be executed on a second computer system, and so on.

Also, the memory 156 is defined herein as both volatile and nonvolatile memory and data storage components. Volatile components are those that do not retain data values upon loss of power. Nonvolatile components are those that retain data upon a loss of power. Thus, the memory 156 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 153 may represent multiple processors and the memory 156 may represent multiple memories that operate in parallel. In such a case, the local interface 159 may be an appropriate network that facilitates communication between any two of the multiple processors, between any processor and any one of the memories, or between any two of the memories etc. The processor 153 may be of electrical, optical, or molecular construction, or of some other construction as can be appreciated by those with ordinary skill in the art.

The operating system 173 is executed to control the allocation and usage of hardware resources such as the memory, processing time and peripheral devices in the network service testing system 150. In this manner, the operating system 173 serves as the foundation on which applications depend as is generally known by those with ordinary skill in the art.

Where the network environment simulation system 100 and the network service test environment 103 are implemented in terms of software, they may be implemented using any one of a number of programming languages such as JAVA, C++, scripting languages, or other languages as can be appreciated by those with ordinary skill in the art. The client controller 129 may specifically be implementing using an appropriate scripting language or as a batch file.

Figure 3:
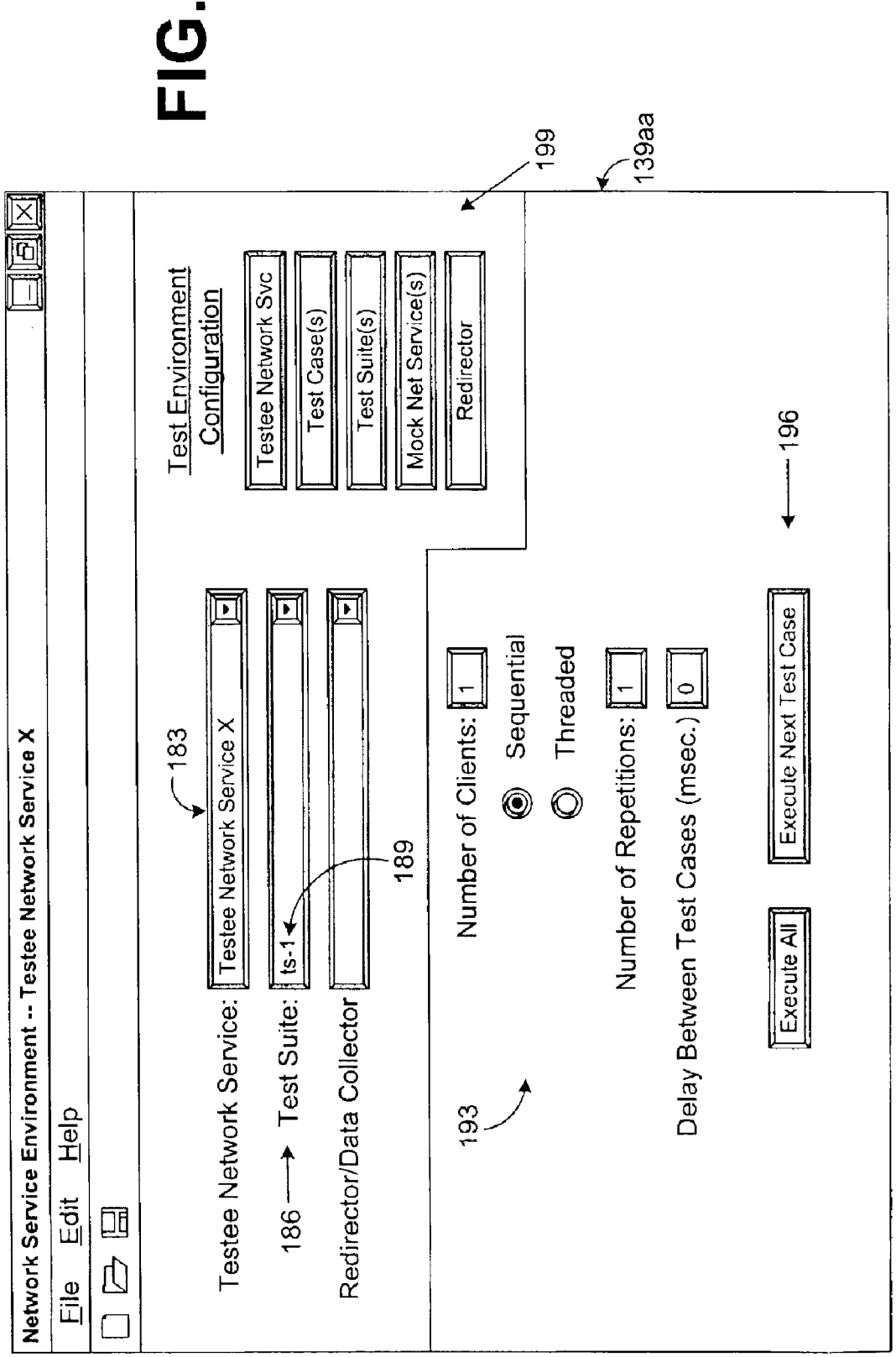
FIG. 3 is a drawing of an example of a user interface generated by the network environment simulation system of FIG. 2 that enables a user to perform various tasks relative to the network service test environment of FIG. 2 according to an embodiment of the present invention.

With reference to FIG. 3, shown is an example of a user interface 139aa according to an embodiment of the present invention. The user interface 139aa allows a user to create a new network service test environment 103 or open an existing network service test environment 103 that is stored, for example, in a memory such as the memory 156 (FIG. 2). Also, the user interface 139aa allows a user to save a newly created network service test environment 103 or altered network service test environment 103 in the memory 156. In this respect, the user interface 139aa includes a testee network service indicator 183 that indicates a current testee network service 106 (FIG. 1) that is to be tested. The user interface 139aa also includes a test suite indicator 186 that indicates currently selected ones of the previously created test suites 189 that are to be used by the mock clients 109 and the testee network service 106 during the execution of a test.

The user interface 139aa also includes mock client control components 193 that allow a user to specify how many mock clients 109 are to be created in a particular network service test environment 103. Also, a user may specify whether the operation of the mock clients 109 would be sequential or threaded and how many repetitions of the specified test suite 189 each mock client 109 is to perform. In addition, a user may specify a time delay between the execution of the test cases in each mock client 109. The user interface 139aa further includes execution control buttons 196. By manipulating an appropriate one of the execution control buttons 196, the user may trigger the execution of all of the test cases within the one or more mock clients 109. Alternatively, the user may trigger the execution of a next one of the test cases, where each test case is executed according to its order in the currently specified test suite 186.

The user interface 139aa also includes a number of test environment configuration buttons 199 that trigger the generation of separate user interfaces 139a (FIG. 2) that facilitate user specification of the configuration for the current network service test environment 103 as will be described.

Figure 4:
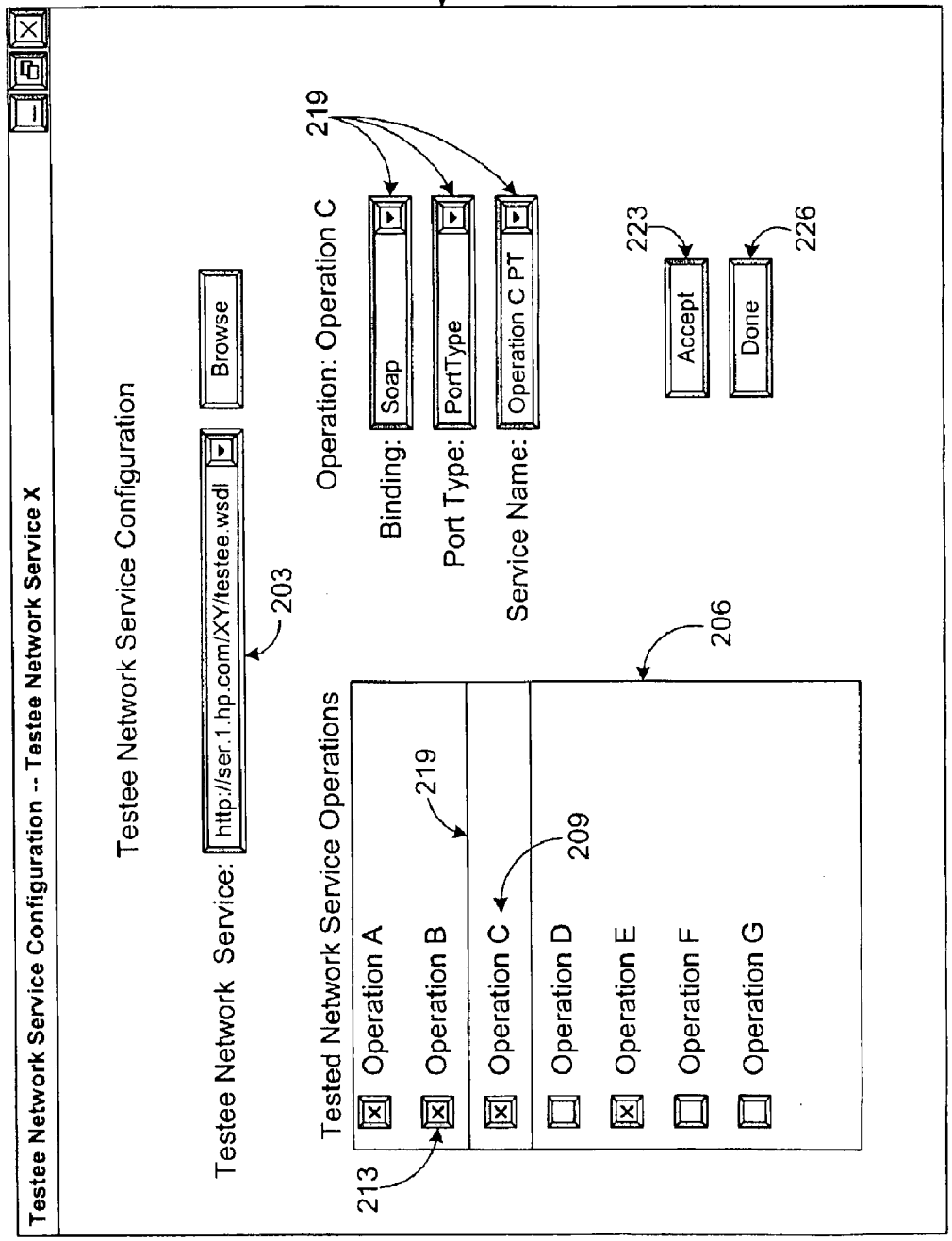
FIG. 4 is a drawing of an example of a user interface generated by the network environment simulation system of FIG. 2 that enables a user to input various data relative a testee network service that is tested by the network service test environment of FIG. 2 according to an embodiment of the present invention.

With reference to FIG. 4, shown is an example of a user interface 139ab according to an embodiment of the present invention. The user interface 139ab is generated upon a user manipulation of the test environment configuration button 196 (FIG. 3) labeled "Testee Network Service". The user interface 139ab facilitates the specification of configuration parameters relating to the testee network service 106 for which the network service test environment 103 is to be implemented. In this respect, the user interface 139ab includes a testee path field 203 within which the network location of the testee network service 106 may be specified so that the various components of the network service test environment 103 can communicate with the testee network service 106. Also, an operations list 206 is provided that indicates the operations 209 performed by the testee network service 106 that may be tested. The operations 209 may be obtained, for example, from a WSDL file associated with the testee network service 106.

An operation selector 213 is associated with each of the operations 209. The operation selectors 213 provide the user with the ability to select which ones of the operations of the testee network service 106 that are eligible to be tested. To make an operation eligible for testing, the user need only to manipulate the corresponding operation selector 213. In addition, the user may select any one of the operations 209 to specify a number of operation parameters 216 associated therewith. For example, the user may manipulate the mouse 169 (FIG. 2) to position a cursor over one of the operations 209 and to click thereon to select the desired operation 209. The selected operation 209 may be indicated by highlighting 219.

The operation parameters 216 displayed in the various fields provided are associated with the current highlighted one of the operations 209. The operation parameters 216 that are specified by the user include a binding type, a port type, and a service name. In addition, other operation parameters 216 may be specified as can be appreciated by those with ordinary skill in the art. The operation parameters 216 may include predefined intercompatibility. Specifically, this means that some selections for one of the operation parameters 216 may be compatible with a select number of the possible choices for another one of the operation parameters 216. For example, the selection of binding type may restrict the selections for the port type. Likewise, the selection of the port type may restrict the selections of the service name, etc.

The user may save the current configuration specified in the user interface 139ab in the configuration database 136 (FIG. 2) by clicking on the "accept" button 223. Also, the user may click on the "done" button 226 to return to the user interface 139aa (FIG. 3). The configuration data that is input using the user interface 139ab is employed by the network environment generation system 134 to perform an automated configuration of the testee network service 106. For example, the network environment generation system 134 may set the binding type, port type, and the service name associated with the testee network service 106.

Figure 5:
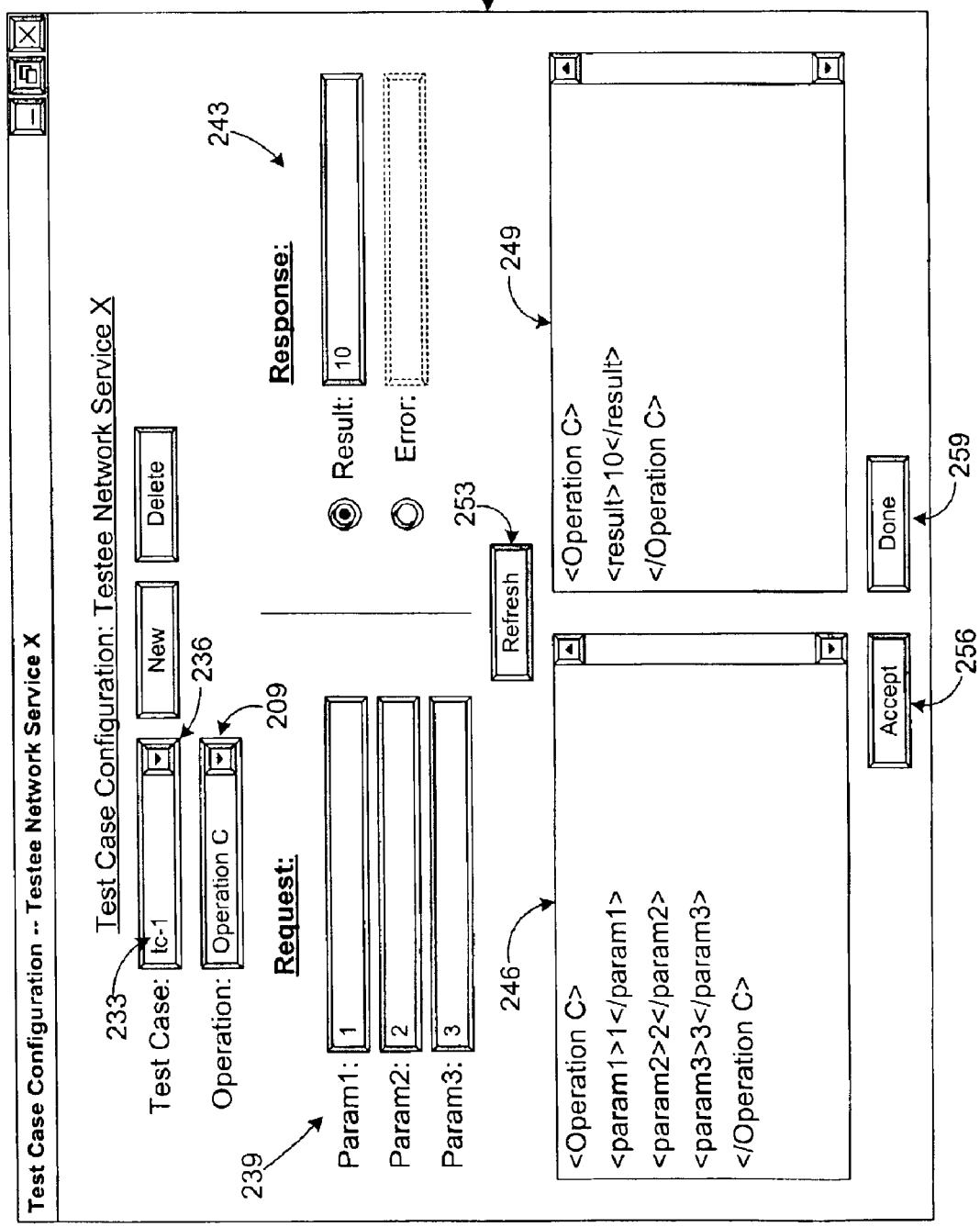
FIG. 5 is a drawing of an example of a user interface generated by the network environment simulation system of FIG. 2 that enables a user to input a number of test cases employed to test a testee network service surrounded by the network service test environment of FIG. 2 according to an embodiment of the present invention.

Turning then to FIG. 5, shown is an example of a user interface 139ac according to an embodiment of the present invention. The user interface 139ac is generated upon a user manipulation of the test environment configuration button 196(FIG. 3) labeled "Test Case(s)". The user interface 139ac facilitates the specification of a number of test cases 233 that are employed by the mock clients 109 to test the testee network service 106. The current test case 233 is indicated in a test case field 236. By manipulating the graphical components shown next to the test case field 236, the user may create new test cases 233 and delete existing test cases 233. Also, a user may alter a current displayed test case 233 as will be discussed.

The user interface 139ac also includes request parameter fields 239 and response parameter fields 243. For the current test case 233 displayed in the test case field 236, the user may enter new request parameters or alter existing request parameters in the request parameter fields 239. Also, the user may enter new response parameters or alter existing response parameters in the response parameter fields 243 that are associated with the currently displayed test case 233. The number of request parameter fields 239 and the number of response parameter fields 243 may vary depending upon the particular operation. The precise number of request parameter fields 239 and response parameter fields 243 may be determined, for example, from the WSDL file for the testee network service 106.

The user interface 139ac also includes a request display box 246 and a response display box 249 in which the actual text of the request and response associated with the current test case 233 are displayed. After the user has entered or altered the request and/or the response parameters, the user may click on or otherwise manipulate the refresh button 253 to display the actual text of the request in the request display box 246 and the actual text of the response in the response display box 249. In this manner, a user may view the actual request and response associated with a respective test case 233. The request and response displayed in the request display box 246 and the response display box 249 may be constructed using XML or other appropriate language.

The user may save the current configuration specified in the user interface 139ac in the configuration database 136 (FIG. 2) by clicking on the "accept" button 256. Also, the user may click on the "done" button 259 to return to the user interface 139aa (FIG. 3).

Figure 6:
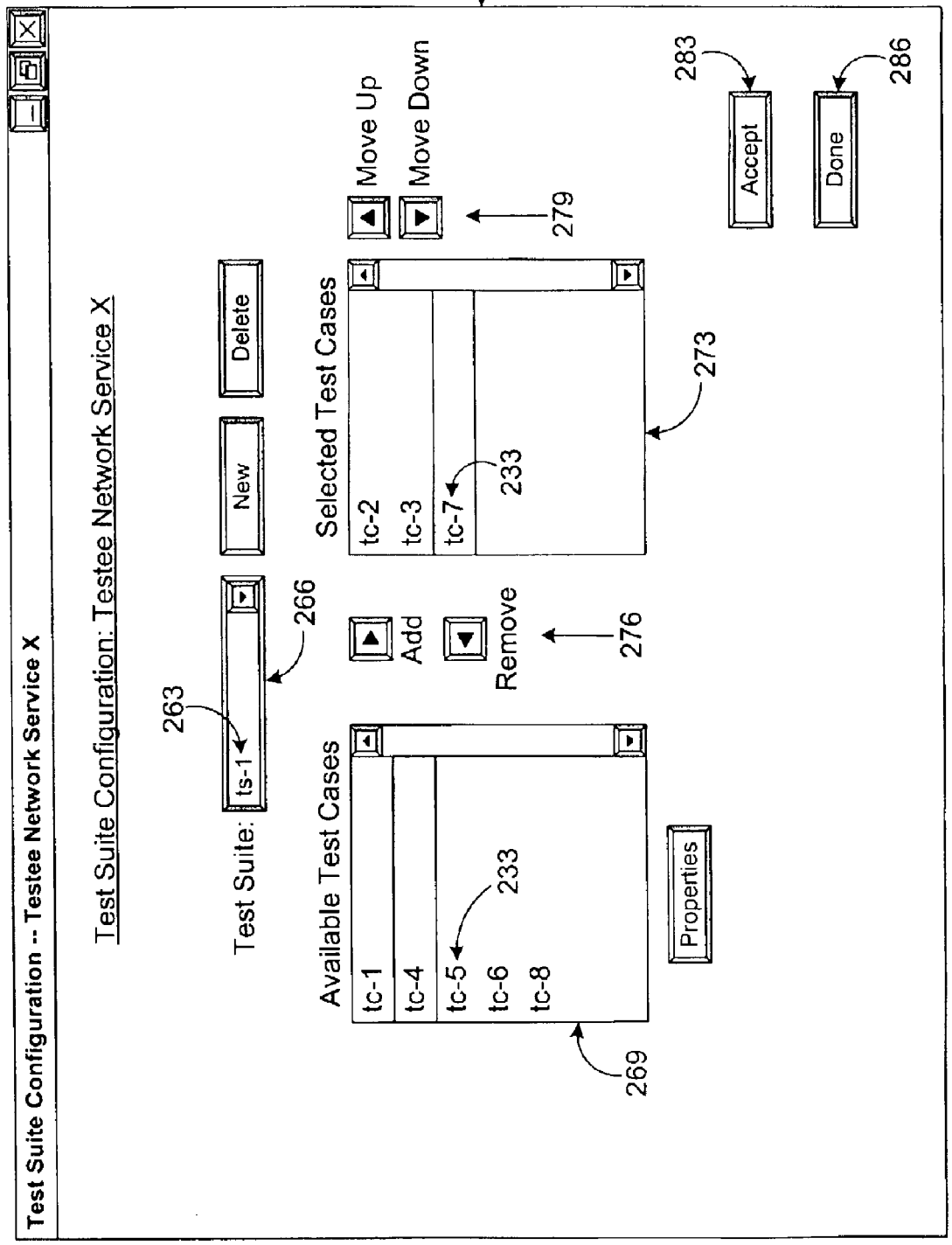
FIG. 6 is a drawing of an example of a user interface generated by the network environment simulation system of FIG. 2 that enables a user to input a number of test suites that group one or more test cases for use in testing a testee network service surrounded by the network service test environment of FIG. 2 according to an embodiment of the present invention.

Referring next to FIG. 6, shown is an example of a user interface 139ad according to an embodiment of the present invention. The user interface 139ad is generated upon a user manipulation of the test environment configuration button 196 (FIG. 3) labeled "Test Suite(s)". The user interface 139ad facilitates the specification of a number of test suites 263. Specifically, the user interface 139ad allows a user to create a new test suite 263 or delete an existing test suite 263. Also, a user may alter an existing test suite 263. The user interface 139ad includes a test suite field 266 within which the user may select an existing test suite 263 to be altered.

The user interface 139ad also includes a potential test case window 269 and a selected test case window 273. All of the test cases 233 that can potentially be included in the current test suite 263 are displayed in the potential test case window 269. To select or deselect one or more of the test cases 233 displayed therein, the user may manipulate the add/remove buttons 276. In response, selected test cases 233 are moved from the potential test case window 269 to the selected test case window 273. Also, deselected test cases are moved from the selected test case window 273 back to the potential test case window 269. In addition, the order in which the test cases 233 appear in the test suite 263 may be specified by a user by manipulating the "move up/down" buttons 279 with respect to highlighted ones of the test cases 233 in the selected test case window 273.

The user may save the current configuration specified in the user interface 139ad in the configuration database 136 (FIG. 2) by clicking on the "accept" button 283. Also, the user may click on the "done" button 286 to return to the user interface 139aa (FIG. 3).

Figure 7:
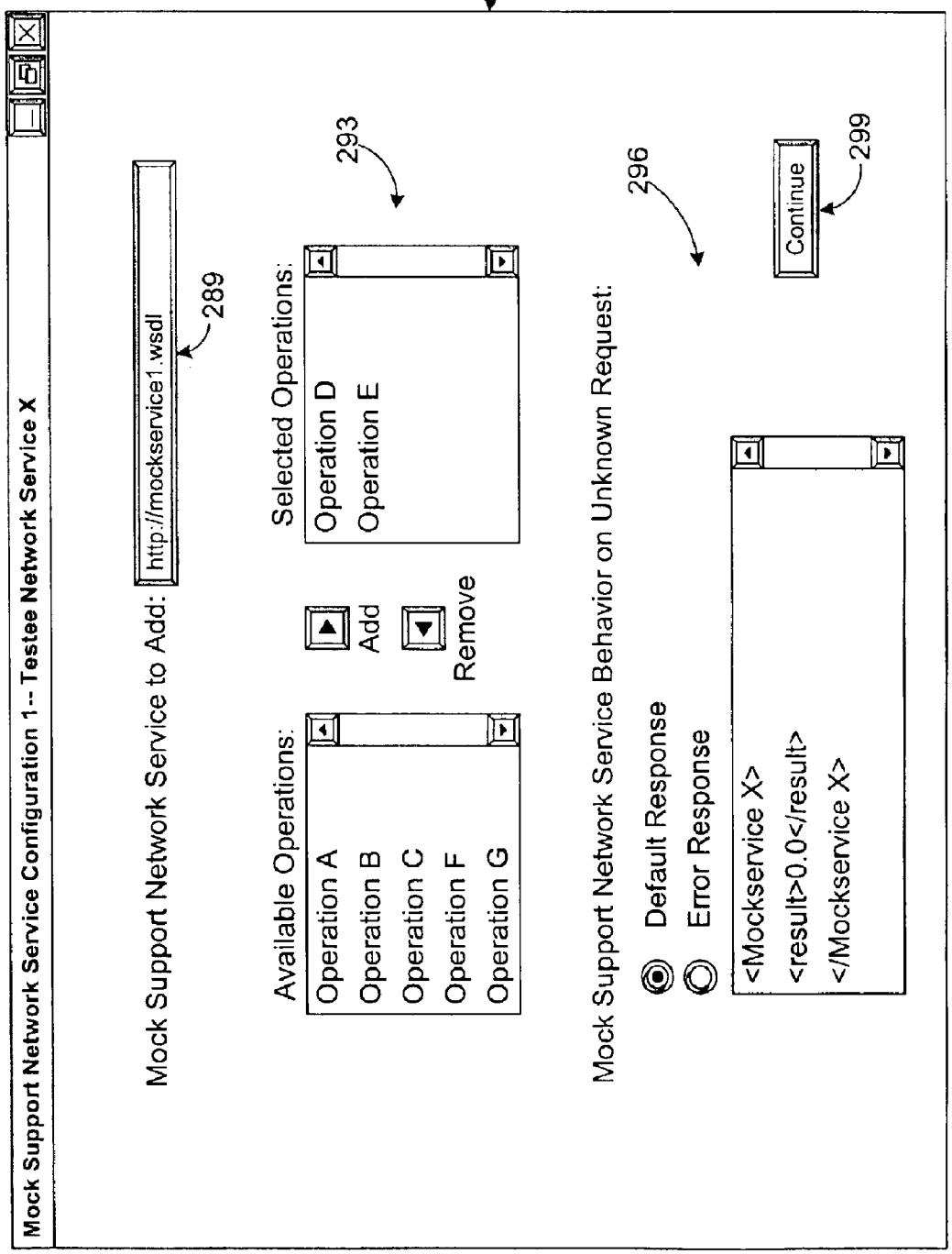
FIG. 7 is a drawing of an example of a first user interface generated by the network environment simulation system of FIG. 2 that enables a user to input data information that is used to generate a mock support network service that are executed as a portion of the network service test environment of FIG. 2 according to an embodiment of the present invention.

With reference to FIG. 7, shown is an example of a user interface 139ae according to an embodiment of the present invention. The user interface 139ae is displayed upon a user manipulation of the test environment configuration button 199 (FIG. 3) labeled "Mock Net Service(s)". The user interface 139ae facilitates a user specification of various parameters and other aspects associated with a mock support network service 113 (FIG. 2). In particular, the user interface 139ae includes a mock service WSDL file path field 289 into which the filename and path of a particular mock service WSDL file 143 (FIG. 2) is entered by-a user. The mock service WSDL file 143 specified is associated with a current mock support network service 113. The mock service WSDL files 143 are created by the user before configuring the network service test environment 103. In addition, the user interface 139ae also includes an operation selection mechanism 293 that facilitates the selection of operations that are to be tested with the mock support network service 113.

Also, the user interface 139ae includes default/error input components 296 that may be manipulated to input default and/or error responses that are transmitted in reply to requests that are unrecognizable by the mock support network service 113. Once a user has completed specification of the various parameters within the user interface 139ae, the user may click on the "continue" button 299 to proceed to the next user interface as will be discussed.

Figure 8:
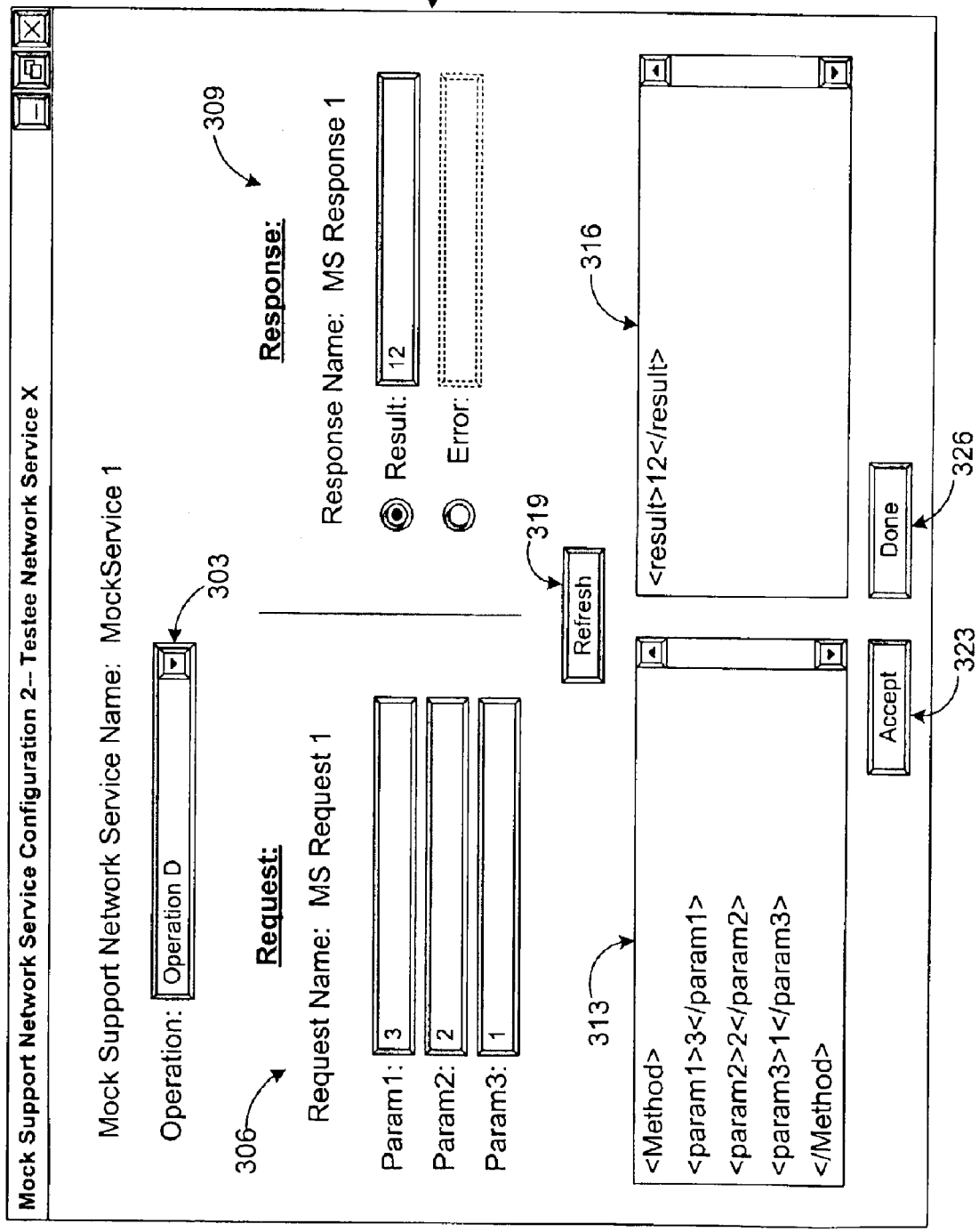
FIG. 8 is a drawing of an example of a second user interface generated by the network environment simulation system of FIG. 2 that enables a user to input data information that is used to generate a mock support network service that are executed as a portion of the network service test environment of FIG. 2 according to an embodiment of the present invention.

With reference to FIG. 8, shown is an example of a user interface 139af according to an embodiment of the present invention. The user interface 139af is generated upon a user manipulation of the continue button 293 (FIG. 7) to facilitate the specification of additional parameters associated with a mock support network service 113. The user interface 139af facilitates a user specification of requests and responses that are stored in a table or other data structure so that the mock support network service 113 can map requests received from the testee network service 106 to proper responses.

To this end, the user interface 139af includes an operation selector 303 that facilitates a selection of one of the operations selected in the user interface 139ae (FIG. 7) with which the current request and response are to be associated. The user interface 139af also includes one or more request parameter fields 306 and response parameter fields 309. The request parameter fields 306 facilitate a user input of parameters associated with an expected request from the testee network service 106. Likewise, the response parameter fields 309 facilitate a user input of parameters associated with the corresponding response that is mapped to the request. The number of request and response parameter fields 306 and 309 may vary, depending upon the operation selected in the operation selector 303. That is to say, the number of parameters in a particular request and the corresponding response are specified by the operations. Thus, the number of request parameter fields 306 and response parameter fields 309 depends upon the operation selected in the operation selector 303.

The user interface 139*af* also includes a request display box 313 and a response display box 316 in which the actual text of the current request and response are displayed. After the user has entered or altered the request and/or the response parameters, the user may click on or otherwise manipulate the refresh button 319 to display the actual text of the request in the request display box 313 and the actual text of the response in the response display box 316. If no parameters have been entered in the request and response parameter fields 306 and 309, then the request display box 313 and the response display box 316 are blank. In this manner, a user may view the actual text of the current request and response. The request and response displayed in the request display box 313 and the response display box 316 may be constructed using XML or other appropriate language.

The user may save the current request and response in the configuration database 136 (FIG. 2) by clicking on the "accept" button 323. Also, the user may click on the "done" button 326 to return to the user interface 139*aa* (FIG. 3) once the user is finished entering all parameters associated with the current mock support network service 113.

Figure 9:
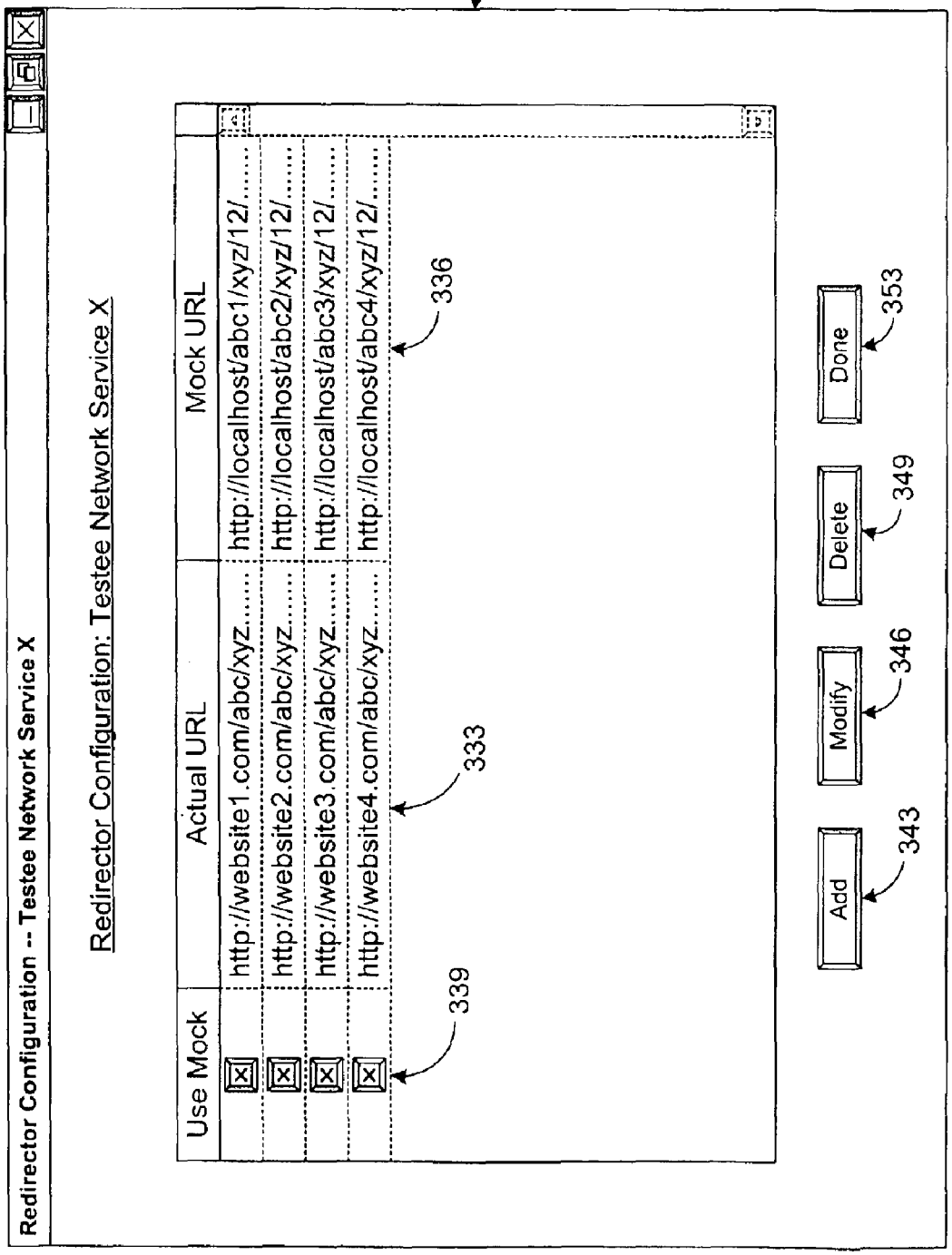
FIG. 9 is a drawing of an example of a user interface generated by the network environment simulation system of FIG. 2 that enables a user to input data information that is used to reroute data traffic between a testee network service and one or more mock support network services of the network service test environment of FIG. 2 according to an embodiment of the present invention.

Turning then to FIG. 9, shown is an example of a user interface 139*ag* according to an embodiment of the present invention. The user interface 139*ag* is generated upon a user manipulation of the test environment configuration button 196 (FIG. 3) labeled "Redirector". The user interface 139*ag* displays a table or equivalent data structure that maps intended destination addresses on a network such as universal resource locators (URLs) of the actual support network services 133 to substitute addresses associated with the mock support network services 113. The table or other data structure is stored in the configuration database 136 (FIG. 2). The user interface 139*ag* facilitates a user entry and modification of mapped pairs of the network address designations. Also, the user interface 139*ag* facilitates the removal or deletion of mapped pairs of the network addresses.

In this respect, the user interface 139*ag* graphically depicts a number of intended destination addresses 333 and corresponding substitute addresses 336 that are associated with actual and mock support network services 133 and 113, respectively. The user interface 139*ag* also includes a rerouting toggle indicator 339 associated with each mapped pair of network addresses 333/336. The user may manipulate the rerouting toggle indicator 339 to place it in either an inactive state or an active state. The redirector 116 (FIG. 2) consults the state of a mapped pair of network addresses 333/336 to determine whether a request from the testee network service 106 that is to be sent to an actual support network service 133 is to be rerouted to a respective mock support network service 113. Assuming that a rerouting toggle indicator 339 is in the inactive state, then the redirector 116 will not reroute requests destined for the intended destination address to a substitute address. On the other hand, if the rerouting toggle indicator 339 is in the active state, then the redirector 116 reroutes requests destined for the associated intended destination address to the corresponding substitute address. Thus, by manipulating the rerouting toggle indicators 339, a user may control the ultimate destination of requests sent to actual support network services 133 by the testee network service 106.

In order to add a new mapped pair of network addresses 333/336, the user may click on the "add" button 343. Also, to modify or delete an existing mapped pair of network addresses 333/336, a user can highlight such mapped pair of network addresses 333/336 by clicking thereon and then clicking the "modify" button 346 or "delete" button 349. If the current state of the mapped pairs of network addresses 333/336 is satisfactory to the user, then the user may click on the "done" button 353 to return to the user interface 139*aa* (FIG. 3).

In addition, it is understood that the user interfaces 139*aa*–139*ag* are merely examples of data entry mechanisms 139 (FIG. 1) that may be employed to allow a user to specify the various parameters and other aspects of a network service test environment 103 (FIG. 1). It is possible that user interfaces may be employed that differ from those shown in FIGS. 3–9. For example, the graphical components employed in alternative user interface may differ from those shown in the user interfaces 139*aa*–139*ag*. Such user interfaces fall within the scope of the present invention. For example, multiple user interfaces may be generated in the form of a wizard to walk the user through the specification process. Alternatively, other interface approaches may be employed.

Figure 10:
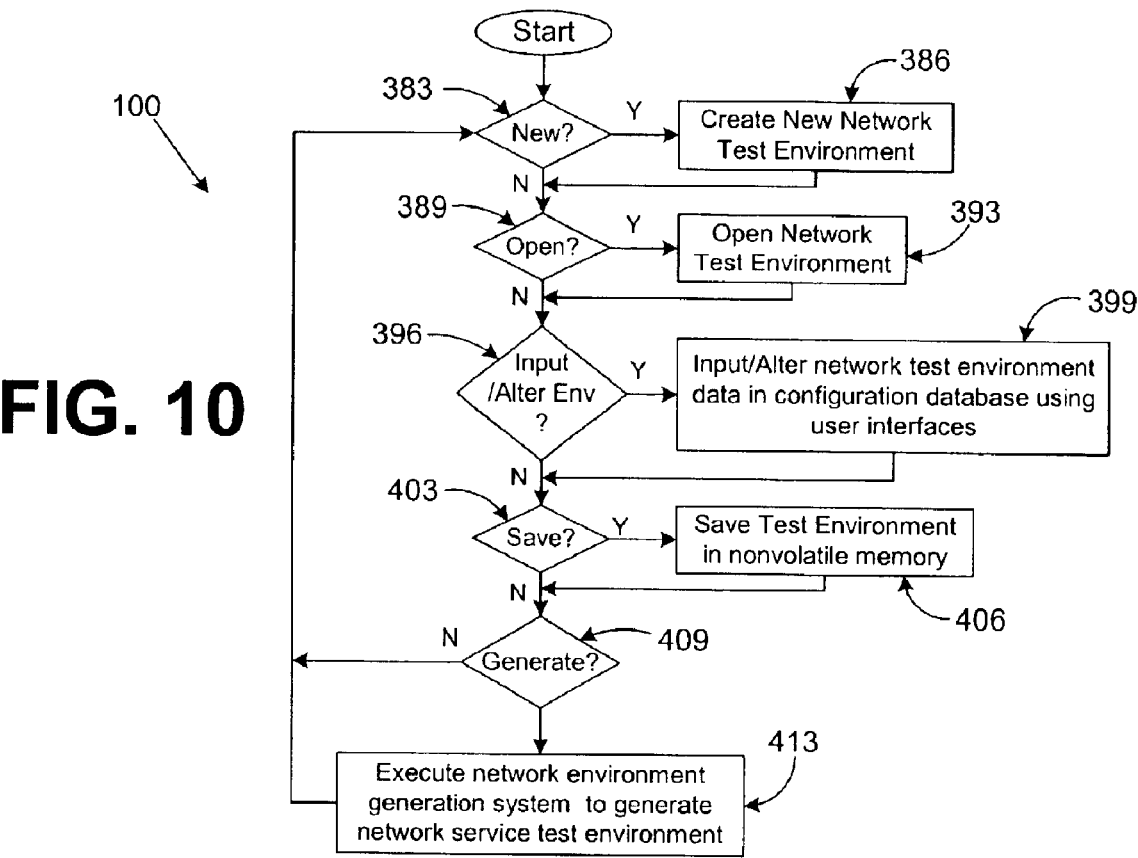
FIG. 10 is an example of a flow chart that illustrates the operation of the network environment simulation system of FIG. 2 in generating the network service test environment of FIG. 2 according to an embodiment of the present invention.

Referring next to FIG. 10, shown is a flow chart that provides one example of the operation of the network environment simulation system 100 and the network environment generation system 134 according to an embodiment of the present invention. Alternatively, the flow chart of FIG. 10 may be viewed as depicting steps of an example of a method implemented in the network service testing system 150 (FIG. 2) to generate and execute a network service test environment 103 (FIG. 1). The functionality of the network environment simulation system 100 as depicted by the exemplary flow chart of FIG. 10 may be implemented, for example, in an object oriented design or in some other programming architecture. Assuming the functionality is implemented in an object oriented design, then each block represents functionality that may be implemented in one or more methods that are encapsulated in one or more objects. The network environment simulation system 100 may be implemented using any one or a combination of a number of programming languages that include, for example, C++, JAVA, Perl, Python, Flash, or other programming languages.

Beginning with box 383, the network environment simulation system 100 determines whether a new network service test environment 103 (FIG. 2) is to be created. This occurs, for example, when a user opens a new network service test environment 103 as was set forth in the discussion of the user interface 139*aa* (FIG. 3). If such is the case, then the network environment simulation system 100 proceeds to box 386 in which a new network service test environment 103 is created and stored in the configuration database 136.

Assuming that no new network service test environment 103 is to be created in box 383 or that a new network service test environment 103 has been created in box 386, the network environment simulation system 100 proceeds to box 389. In box 389, the network environment simulation system 100 determines whether an existing network service test environment 103 has been opened by the manipulation, for example, of graphical components in the user interface 139*aa* as was discussed with reference to FIG. 3. If such is the case, then the network environment simulation system 100 proceeds to box 393 in which an existing network service test environment 103 is obtained from the configuration database 136 and is displayed in the various user interfaces 139*aa*–139*ag* (FIGS. 3–9).

Provided that no existing network service test environment 103 is opened in box 389, or that an existing network service test environment 103 has been opened in box 393, then the network environment simulation system 100 proceeds to box 396. In box 396, the network environment simulation system 100 determines whether any test environment data or parameters associated with a current network service test environment 103 displayed in the user interfaces 139*aa*–139*ag* have been entered or altered by manipulation of the user interfaces 139*aa*–139*ag*. If such is the case, then the network environment simulation system 100 proceeds to box 399 in which all corresponding data and parameters of the network service test environment 103 stored in the configuration database 136 are updated.

If no inputs or alterations have been made in box 396, or that the network service test environment data and parameters have been updated in box 399, then the network environment simulation system 100 proceeds to box 403. In box 403, the network environment simulation system 100 determines whether a network service test environment 103 displayed in the user interfaces 139*aa*–139*ag* is to be saved in the configuration database 136 for future access. If such is the case, then the network environment simulation system 100 proceeds to box 406. Otherwise, the network environment simulation system 100 proceeds to box 409. In box 406, the currently displayed network service test environment 103 is stored in the configuration database 136. Thereafter, the network environment simulation system 100 proceeds to box 409.

In box 409, the network environment simulation system 100 determines whether the network service test environment 103 is to be executed. This may occur, for example, if the user manipulates one of the execution control buttons 196 in the user interface 139*aa* (FIG. 3). If so, then the network environment simulation system 100 proceeds to box 413. Otherwise, the network environment simulation system 100 reverts back to box 383 as shown.

In box 413, the network environment simulation system 100 executes the network environment generation system 134 (FIG. 1) to generate the network service test environment 103. Thereafter, the network environment simulation system 100 reverts back to box 383 as shown.

Figure 11:
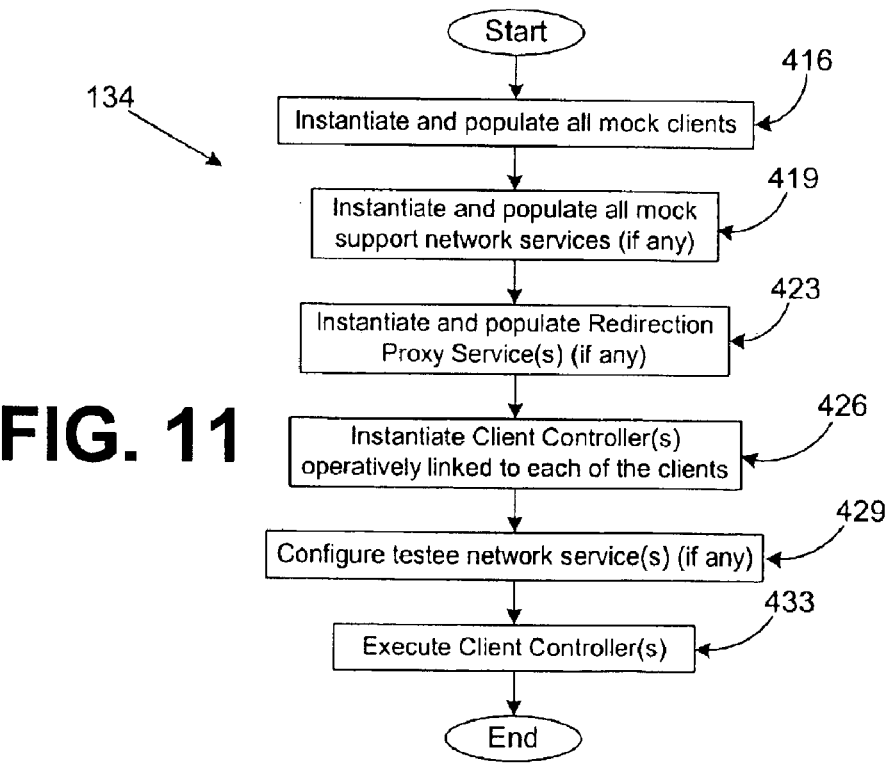
FIG. 11 is an example of a flow chart that illustrates the operation of the network environment generation system that is executed as a portion of the network environment simulation system of FIG. 2 in generating the network service test environment of FIG. 2 according to an embodiment of the present invention.

Referring next to FIG. 11, shown is a flow chart that provides one example of the operation of the network environment generation system 134 that is executed as a portion of the network environment simulation system 100 according to an embodiment of the present invention. Alternatively, the flow chart of FIG. 10 may be viewed as depicting steps of an example of a method implemented in the network service testing system 150 (FIG. 2) to generate and execute a network service test environment 103 (FIG. 1). The functionality of the network environment generation system 134 as depicted by the exemplary flow chart of FIG. 10 may be implemented, for example, in an object oriented design or in some other programming architecture. Assuming the functionality is implemented in an object oriented design, then each block represents functionality that may be implemented in one or more methods that are encapsulated in one or more objects. The network environment generation system 134 may be implemented using any one or a combination of a number of programming languages that include, for example, C++, JAVA, Perl, Python, Flash, or other programming languages.

In box 416, the network environment generation system 134 begins to create the network service test environment 103 by instantiating the mock clients 109 (FIG. 1). In this respect, the mock clients 109 may be instantiated from a class or template and such mock clients 109 may be populated with the parameters and other data input by the user. Thereafter, in box 419, the network environment generation system 134 instantiates the mock support network services 113 (FIG. 1) (if any) in a manner similar to the instantiation of the mock clients 109. The mock support network services 113 are populated in a manner similar to the mock clients 109. Next, in box 423, the network environment generation system 134 instantiates and populates the redirector 116. However, if no mock support network services 113 have been instantiated, then the redirector 116 need not be instantiated. Then, in box 426, the network environment generation system 134 instantiates and populates the client controller 129. In this respect the client controller 129 is operatively coupled to each of the mock clients 109 and initiates the operation thereof. Then in box 429, the network environment generation system 134 configures the testee network service 106 in accordance with the configuration data input by the user and stored in the configuration database 136 as described above. Thereafter, in box 433, the network environment generation system 134 executes the functions of the client controller 129 to begin the testing of the testee network service 106. Thereafter, the network environment generation system 134 reverts back to box 383.

In addition, the network environment generation system 134 also includes other functionality not described with reference to the flowchart of FIG. 10 as is indicated by the appearance of the user interfaces 139*aa*–139*ag*.

Although the network environment simulation system 100 (including the network environment generation system 134) and the network service test environment 103 are each embodied in software or code executed by general purpose hardware as discussed above, as an alternative they may also be embodied in dedicated hardware or a combination of software/general purpose hardware and dedicated hardware. If embodied in dedicated hardware, the network environment simulation system 100 (including the network environment generation system 134) and/or the network service test environment 103 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams, user interfaces, and/or flow chart of FIGS. 1–11 show the architecture, functionality, and operation of an implementation of the network environment simulation system 100 (including the network environment generation system 134) and the network service test environment 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 10 and 11 show a specific order of execution, it is understood that the order of execution may differ from that which is depicted. For example, the order of execution of two or more blocks may be scrambled relative to the order shown. Also, two or more blocks shown in succession in FIGS. 10 and 11 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the network environment simulation system 100 (including the network environment generation system 134) and/or the network service test environment 103 comprises software or code, they can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the network environment simulation system 100 (including the network environment generation system 134) and the network service test environment 103 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A network service test system, comprising:
    a testee network service stored in a memory and executable by a processor;
    a network service test environment surrounding the testee network service, the network service test environment comprising:
        at least one mock client in data communication with and interacting with the testee network service; and
        at least one mock support network service in data communication with the testee network service, the at least one mock support network service simulating a performance of an actual support network service while a data communication link exists between the actual support network service and the testee network service.

2. The network service test system of claim 1, further comprising a redirector in data communication with the testee network service and the at least one mock support network service, wherein a number of requests transmitted by the testee network service to the actual support network service are rerouted by the redirector to the at least one mock support network service.

3. The network service test system of claim 2, wherein the redirector routes a number of responses from the at least one mock support network service to the testee network service in response to the requests, respectively.

4. The network service test system of claim 1, further comprising a network service environment generation system that generates the at least one mock client and the at least one mock support network service.

5. The network service test system of claim 1, wherein the network service environment generation system that generates the at least one mock client and the at least one mock support network service, further comprises:
    logic stored in the memory and executable by the processor that generates the at least one mock client from a mock client template; and
    logic stored in the memory and executable by the processor that generates the at least one mock support network service from a mock support network service template.

6. The network service test system of claim 1, wherein the at least one mock support network service further comprises a lookup table that maps a number of requests expected from the testee network service to a corresponding number of responses.

7. The network service test system of claim 1, further comprising a number of test cases associated with the at least one mock client, wherein each of the test cases specifies a request that is to be transmitted to the testee network service and a response expected from the testee network service in reply to the request.

8. The network service test system of claim 7, wherein the number of test cases are grouped into a test suite.

9. A program embodied in a computer readable medium to facilitate network service testing, comprising:
    code that generates a network service test environment that surrounds a testee network service, the network service test environment comprising:
        at least one mock client that interacts with the testee network service; and
        at least one mock support network service that interacts with the testee network service, wherein the at least one mock support network service simulates a performance of an actual support network service while a data communication link exists between the actual support network service and the testee network service.

10. The program embodied in the computer readable medium of claim 9, wherein the network service test environment further comprises code that redirects a number of requests transmitted to the actual support network service by the testee network service to the at least one mock support network service.

11. The program embodied in the computer readable medium of claim 10, wherein the network service test environment further comprises code that redirects a number of responses from the at least one mock support network service to the testee network service in response to the requests, respectively.

12. The program embodied in the computer readable medium of claim 9, wherein the code that generates the network service test environment that surrounds the testee network service, further comprises:
   code that generates the at least one mock client from a mock client template; and
   code that generates the at least one mock support network service from a mock support network service template.

13. The program embodied in the computer readable medium of claim 9, wherein the at least one mock support network service further comprises a lookup table that maps a number of requests expected from the testee network service to a corresponding number of responses.

14. The program embodied in the computer readable medium of claim 13, wherein the code that generates the network service test environment that surrounds the testee network service further comprises code that facilitates a user input of the requests and the responses.

15. The program embodied in the computer readable medium of claim 9, further comprising a number of test cases associated with the at least one mock client, wherein each of the test cases specifies a request that is to be transmitted to the testee network service and a response expected from the testee network service in reply to the request.

16. The program embodied in the computer readable medium of claim 15, wherein the number of test cases are grouped into a test suite.

17. The program embodied in the computer readable medium of claim 15, wherein the code that generates the network service test environment that surrounds the testee network service further comprises code that facilitates a user input of the test cases.

18. A method for network service testing, comprising the steps of:
   executing a testee network service using at least one processor circuit;
   executing a network service test environment surrounding the testee network service on the at least one processor circuit, wherein the executing of the network service test environment further comprises the steps of:
      executing at least one mock client that interacts with the testee network service; and
      executing at least one mock support network service that interacts with the testee network service, the at least one mock support network service simulating a performance of an actual support network service while a data communication link exists between the actual support network service and the testee network service.

19. The method of claim 18, wherein the step of executing the network service test environment surrounding the testee network service further comprises the step of rerouting a number of requests transmitted to the actual support network service by the testee network service to the at least one mock support network service.

20. The method of claim 18, further comprising the step of generating the network service test environment that surrounds the testee network service.

21. The method of claim 20, wherein the step of generating the network service test environment that surrounds the testee network service further comprises the steps of:
   generating the at least one mock client from a mock client template; and
   generating the at least one mock support network service from a mock support network service template.

22. The method of claim 20, wherein the step of generating the network service test environment that surrounds the testee network service further comprises facilitating a user input of a number of test cases that are associated with the at least one mock client, wherein each of the test cases specifies a request that is to be transmitted from the at least one mock client to the testee network service and a response expected from the testee network service in reply to the request.

23. The method of claim 20, wherein the step of generating the network service test environment that surrounds the testee network service further comprises facilitating a user input of a number of requests and a corresponding number of responses to be associated with the at least one mock support network service.

24. A system for network service testing, comprising:
   a testee network service executed on at least one processor circuit; and
   testing means for testing an operation of the testee network service, the testing means further comprising:
      first means for simulating an operation of at least one client with respect to the testee network service; and
      second means for simulating an operation of at least one actual support network service with respect to the testee network service while a data communication link exists between the at least one actual support network service and the testee network service.

25. The system of claim 24, wherein the testing means further comprises means for rerouting a number of requests transmitted to the actual support network service by the testee network service to the second means.

26. The system of claim 24, further comprising means for generating the testing means.

* * * * *